Feb. 11, 1941.    G. V. FEARN    2,231,064
MACHINE FOR MOLDING CEMENTITIOUS BLOCK
Filed Oct. 24, 1938    3 Sheets-Sheet 1

Inventor
Guy V. Fearn
By W. S. M. Howell
Attorney

Feb. 11, 1941.   G. V. FEARN   2,231,064
MACHINE FOR MOLDING CEMENTITIOUS BLOCK
Filed Oct. 24, 1938   3 Sheets-Sheet 2

Inventor
Guy V. Fearn
By W. S. McDowell
Attorney

Feb. 11, 1941.     G. V. FEARN     2,231,064
MACHINE FOR MOLDING CEMENTITIOUS BLOCK
Filed Oct. 24, 1938     3 Sheets-Sheet 3
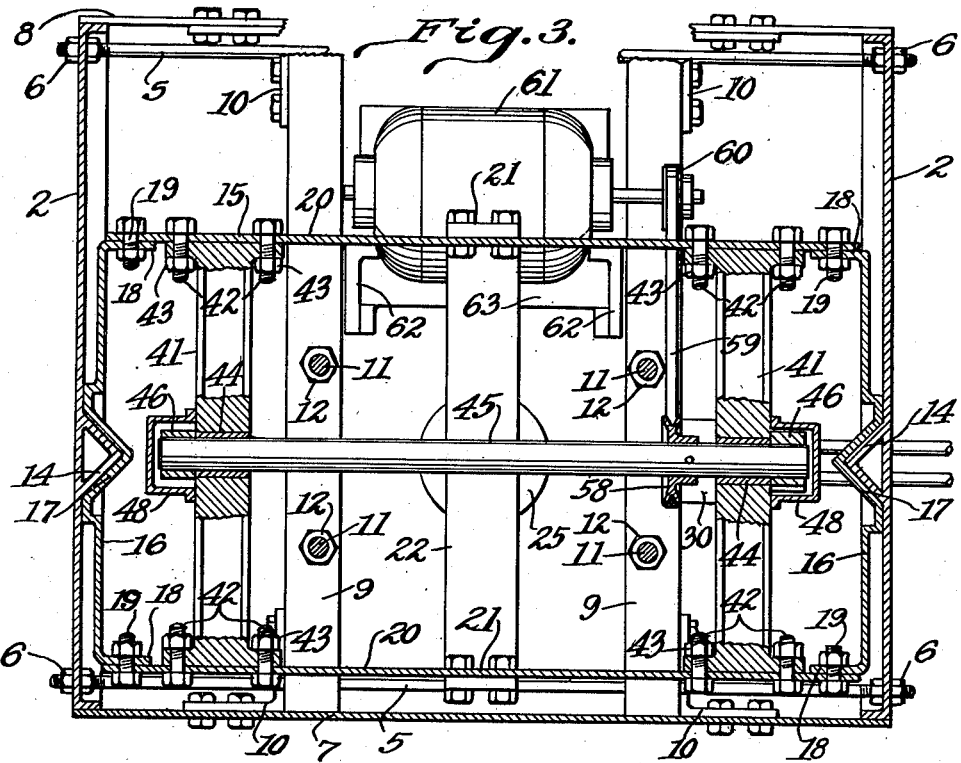
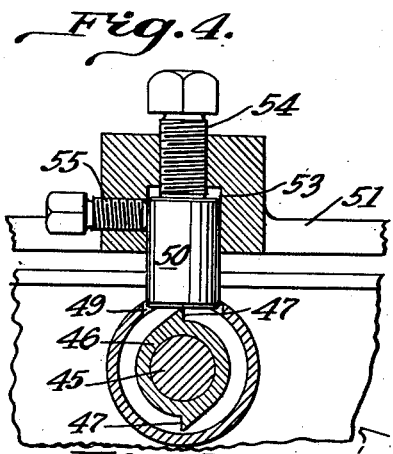
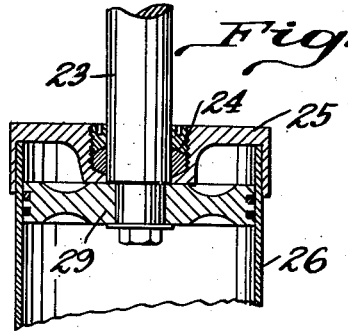
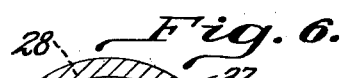
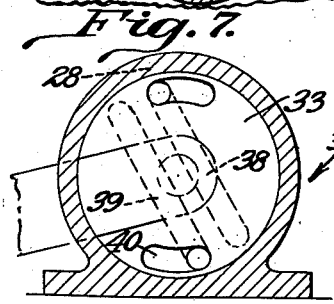
Inventor
Guy V. Fearn
W. S. M. Howell
Attorney Patented Feb. 11, 1941

2,231,064

UNITED STATES PATENT OFFICE 2,231,064

MACHINE FOR MOLDING CEMENTITIOUS BLOCK

Guy V. Fearn, Fredericktown, Ohio; Goldye C. Fearn administratrix of said Guy V. Fearn, deceased Application October 24, 1938, Serial No. 236,679

10 Claims. (Cl. 25—41)

This invention relates to an improved molding or casting machine adapted, in its more specific aspects, to the formation of concrete or other cementitious building blocks, although in a broader sense, to the molding or casting of various types of bodies producible from ceramic materials when the latter are reduced to a plastic condition.

It is a primary object of the invention to provide a machine for the purpose set forth having an improved and simplified design, one of low initial manufacturing costs, easy and convenient to operate and having, further, a relatively high capacity for producing molded products.

Another object of the invention resides in the provision of a machine for molding plastic substances having a vertically movable mold box provided with a relatively stationary bottom, the box being filled from the top with a plastic cementitious material while the mold is rapidly vibrated, the particles composing the plastic material being thereby crowded together in compact form so that the material will take the shape of the mold and possess the required density when the molding operation is completed without involving the use of the presses of the prior art.

For a further understanding of the invention, reference is to be had to the following description and the accompanying drawings, wherein.

Fig. 3 is a horizontal sectional view taken through the machine on the line III—III of Fig. 2;

Fig. 4 is a detail vertical sectional view on the line IV—IV of Fig. 2;

Fig. 5 is a similar view on the line V—V of Fig. 2;

Fig. 6 is a detail vertical sectional view through the hoist valve on the line VI—VI of Fig. 2;

Fig. 7 is a view similar to Fig. 6 but disclosing the valve in another position of adjustment.

Figure 1:
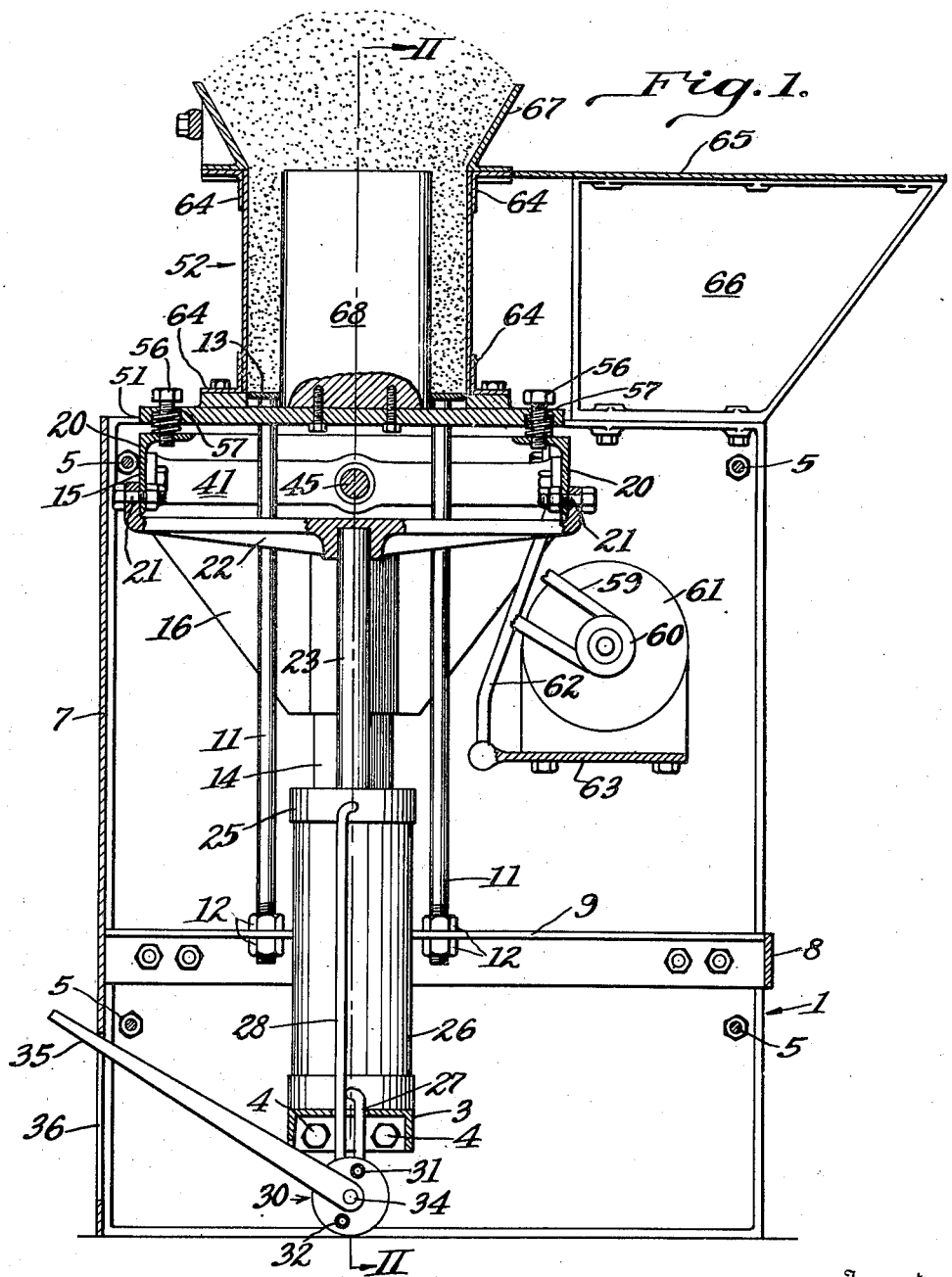
Fig. 1 is a vertical transverse sectional view taken through the molding or casting machine forming the subject of the present invention.

In the specific form of the molding machine comprising the present invention illustrated in the accompanying drawings, the numeral 1 designates the base or supporting frame, the latter being composed in this instance of a pair of vertically arranged and longitudinally spaced end plates 2—2. Uniting these plates is an inverted channel bar 3 having down-turned end flanges which are joined with the plates 2—2 by means of bolts or other suitable securing elements 4. The plates are also united and maintained in their vertically spaced order by means of a plurality of longitudinally extending tie rods 5 which have their threaded ends arranged to pass through suitable openings formed in the plates 2 and equipped with nuts 6 which, upon being tightened, produce in combination with the end plates a rigid frame structure. At the front of the frame structure, there is provided a vertical front plate, as indicated at 7, this plate having its opposite vertical edge portions secured to the front edges of the end plates 2—2. The back of the frame structure, immediately above the channel bar 3, is provided with a longitudinally extending strap 8, secured at its ends to the rear vertical edges of the end plates 2—2.

Extending transversely of the frame structure is a pair of longitudinally spaced and transversely disposed angle irons 9. These angle irons have their opposite ends bolted to angle brackets 10, which latter are, in turn, bolted to the strap 8 and to the front plate 7. Arising from the horizontal legs of the angle irons 9 is a set of four rectangularly spaced pallet supporting rods 11. The lower ends of these rods are threaded and pass through openings formed in the angle irons 9, the threaded lower ends of said rods receiving nuts 12 by which the rods are stationarily fastened or mounted in connection with the frame structure in vertical positions. The upper ends of said rods are terminated in a uniform horizontal plane and removably support thereon a mold pallet 13.

The end plates 2 have cast or otherwise formed on the inner surfaces thereof a pair of vertical guides 14—14, which guides are substantially triangular in horizontal cross section, as disclosed in Fig. 3, that is, the same possess reversely inclined sides. Slidably supported for vertical movement in connection with these guides is a mold carriage designated generally by the numeral 15. This carriage comprises, in the form of the machine illustrated, a pair of vertical end plates 16, which are formed with grooves or ways 17 for the reception of the guides 14 of the end plates 2, the grooves or ways 17 having the same cross sectional configuration as said guides, so that the mold carriage may be moved vertically in the frame structure but constrained against other movement.

The plates 16 are provided with flanges 18, which are bolted as at 19 or otherwise secured to the ends of a pair of spaced longitudinally extending angle bars 20—20. Intermediately of their lengths, the angle bars are connected as at 21 with the ends of a transversely disposed yoke 22. This yoke is carried at the upper end of a piston rod 23, the lower portion of the piston rod passing through an adjustable packing 24 provided in the head 25 of a hydraulic hoist cylinder 26. The lower head of this cylinder is secured to the channel bar 3 and fluid inlet and outlet lines 27 and 28 enter the top and bottom heads of said cylinder to control the elevation and descent of a slidable piston 29 arranged in said cylinder, and with which the lower end of the rod 23 is connected, as in Fig. 5. A manually operated valve 30 is employed to govern the inflow and outflow of a fluid, such as water under city main pressure, into and out of both ends of the cylinder 26, so that the descent of the piston will be effected by means of fluid pressure as well as the ascent thereof.

To accomplish this end, the casing of the valve 30 is joined with a single fluid inlet pipe 31 and with a fluid outlet pipe 32. The arrangement of these pipes is best shown in Fig. 1, wherein it will be noted that said pipes are spaced equidistantly on opposite sides of a center line passing vertically through the axis of the valve. Within the valve, there is arranged a rotor 33, having a shaft 34 extending exteriorly of the valve casing and equipped with a foot treadle 35, the operating end of the latter extending through a slot 36 provided in the front plate 7 of the frame structure.

In the position of the valve 30, as shown in Fig. 6, fluid is being supplied to the bottom of the cylinder 26 to maintain the piston 29 at the upper end of said cylinder. Thus the water or other fluid enters the valve by way of the inlet pipe 31, travels through an arcuate slot 37 formed longitudinally in the rotor 33. After passing through the slot 37, the fluid travels downwardly through a passage 38, formed in one end of the rotor, and thence into the pipe 27 which leads to the bottom of the cylinder 26, producing pressure on the bottom of the piston 29 to effect its elevation, or to maintain the piston in its fully elevated position. The liquid on the top of the piston, during elevation of the latter, is displaced by passing outwardly from the top of the cylinder through the pipe line 28 which enters the valve casing 30 at a position contiguous to the upper portion of the latter. The displaced fluid then passes through a vertical passage 39 formed in one end of the rotor 33 contiguous and parallel to the passage 38. From the passage 39, the displaced fluid from the cylinder 26 passes through an arcuate slot 40, which extends longitudinally through the rotor from one end of the latter to the other, the slot 40 registering with the fluid outlet pipe 32, which may lead to a sewer drain or other disposal point.

When the descent of the piston is desired, and the mold carriage associated therewith, the outer end of the treadle 35 is depressed, resulting in the partial rotation of the rotor 33 so that the latter will assume the position disclosed in Fig. 7. As shown in this latter figure, liquid under pressure from the stationary inlet pipe 31 flows through the arcuate slot 37 and thence directly into the pipe 28, since the passage 38 has been moved out of registration with the pipe 27. This permits the fluid pressure to be applied to the top of the piston, causing its forced descent. During such descent, the fluid displaced from the bottom of the cylinder passes through the pipe 27 and thence directly through the slot 40 to the outlet pipe 32.

Connected with the angle bars 20 of the mold carriage is a pair of transversely extending and longitudinally spaced bearing bars 41. These bars have their ends formed with apertured lugs for the reception of bolts 42, the latter passing through the angle bars 20, and having their threaded end equipped with nuts 43 in order to firmly and rigidly unite the bearing bars with the mold carriage, forming a unitary part thereof.

Rotatably supported in longitudinally aligned bearings 44 provided in the bars 41 intermediately of their ends is a vibrator shaft 45. The ends of this shaft have fastened thereto a pair of cams 46. Each cam is formed with a pair of shoulders 47 located approximately 180 degrees apart, and in placing the cams 46 on the ends of the shaft 45, the four shoulders provided on the two cams are located approximately 90 degrees apart. The cams 46 are covered by means of caps 48, and each of these caps is provided with an opening 49 in the top thereof through which projects a vertically adjustable stud 50. The studs 50 are carried in the opposite longitudinal ends of the base plate 51 of a vibratory mold 52. As shown more particularly in Fig. 4, the plate 51 is formed at each end with a socket 53 in which the upper portion of the stud 50 is positioned. The upper end of the stud bears on the inner end of a vertical set screw 54 and is additionally retained in place by means of a horizontal set screw 55. It will be understood that by adjusting these screws 54 and 55 and correspondingly the stud 50 associated therewith, the degree of lift imparted to said stud or studs by the action of the shouldered portions of the cams 46 may be varied, thereby regulating the amount of vibratory movement imparted by the shaft 45 to the mold.

The mold is guided by providing the horizontal flanges of the angle bars 20 with threaded openings in which are positioned set screws 56. The shanks of these set screws pass loosely through openings 57 provided therefor in the base plate 51 of the mold. The set screws 56, therefore, serve to guide the mold plate 51 but they do not interfere with the vibratory movement imparted to said plate by the action of the cams 46. When the mold carriage is depressed or lowered by the action of the hydraulic hoist mechanism, the headed upper ends of the set screw 56 may engage with the base plate 51 to cause its positive downward movement in association with the mold carriage.

The cam or vibrator shaft 45 is rotated by providing the same with a pulley wheel 58. Around this wheel, there is trained an endless belt 59, preferably of the V-type in transverse cross section. The belt 59 leads to a sheave or pulley 60 provided on the armature shaft of an electric motor 61. This motor is supported by means of depending brackets 62, the latter having their upper ends rigidly bolted to the angular base 20 and their lower ends connected with the horizontal shelf 63 to which the frame of the motor is bolted. The motor therefore moves in unison with the mold carriage and maintains at all times its driving relation with the cam shaft 45.

Figure 2:
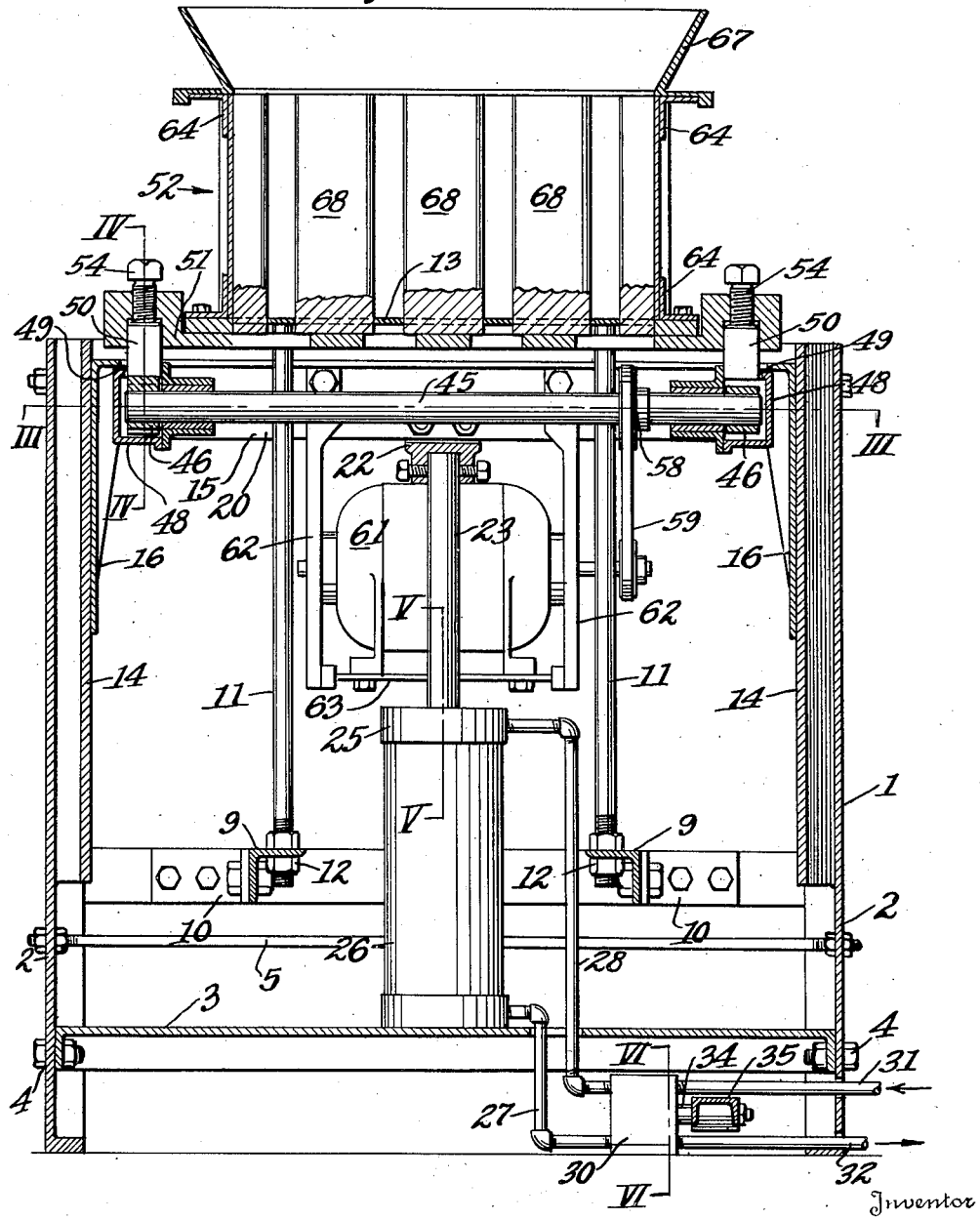
Fig. 2 is a vertical longitudinal sectional view through the machine, the plane of the figure being indicated by the line II—II of Fig. 1.

The mold 52 comprises a substantially rectangular, box-like, metallic frame open at its top and bottom. The lower portion of this mold frame is suitably secured to the base plate 51. The pallet 13 forms, in effect, the bottom of the mold but has no direct connection therewith. In this regard, it will be observed that the base plate 51 of the mold is provided with openings through which the upper ends of the stationary rods 11 project, the base plate sliding on and vertically with respect to the rods 11. The upper and lower edge portions of the mold frame are bounded and reenforced by means of angle members 64. This upper set of angle members registers with a stationary horizontally disposed mix-receiving plate 65, which is supported in the horizontal plane registering with the top of the mold, when the latter is elevated, by means of stationary frame bars 66 arising from the base or frame 1. Slidable on the mixing plate and the angle member 64 of the mold when the latter is elevated to assume the positions disclosed in Figs. 1 and 2, is a sliding hopper 67. Normally, this hopper is positioned over the mix-receiving plate 65, and into this hopper frame, there is poured or otherwise introduced a plastic mass of material from which cement blocks are formed.

When the mold is elevated to assume the position disclosed in Fig. 1, the filled hopper frame is slidably moved in an outward direction until it registers with the top of the mold. The circuit governing the operation of the motor 61 is then closed, so that the motor is energized and power imparted to the cam shaft 45. The rotation of this shaft and the cams 46 carried thereby effects intermittent but rapid contact of the shouldered portions of said cams with the mold studs 50, causing the mold to be rapidly vibrated so that the plastic cementitious material introduced into said mold and contained in the hopper frame will settle into a relatively dense and compact mass, taking the form of the interior of the mold.

Following the necessary period of vibration, the operation of the motor 61 is discontinued. The hopper frame 67 is restored to its normal position over the plate 65 by manually sliding the same rearwardly. The valve treadle 35 is operated to produce fluid pressures in the cylinder 26 by which the mold carriage and mold part supported thereby are moved downwardly. This action is made positive by the action of the headed set screws 56 joined with the angle bars 29 and wherein the heads of said set screws contact with the mold plate 51 to cause downward movement thereof against the resistance of the plastic molded material resting on the stationary pallet 13.

Also, in molding concrete block used for building purposes, the mold plate is equipped with a plurality of upstanding cores of the type shown at 68, and therefore a positive force is required, other than the action of gravity, to move the mold downwardly and break adhesion or cohesion between the surfaces of the mold and the molded materials forming the concrete block. When the mold has been fully lowered, the molded cementitious block together with the pallet 13, is removed from the top of the rods 11 and transferred to a conveyor, rack, car or other means of support as a finished molded product.

It will be seen that the machine comprising the present invention is essentially simple in its construction and mode of operation. The machine enables finished blocks to be rapidly and conveniently molded. Heavy and complicated apparatus, such as the ordinary press mechanism, has been eliminated, and by this means the cost of the machine as a finished manufactured product has been materially reduced in comparison with prior machines having equivalent capacity.

While I have described what I consider to be the preferred embodiment of the invention, nevertheless it will be understood by those skilled in the art that the constructional features herein particularly pointed out are subject to considerable variation without departing from the scope of the annexed claims.

What is claimed is:

1. A molding machine for producing ceramic building block, comprising a frame structure, a mold carriage movable vertically in said frame structure between material-receiving and discharging positions, fluid actuated mechanism for supporting and moving said carriage, power driven mold vibrating means supported by and movable with said carriage, a mold having a box-like frame movably mounted on said carriage, said mold being engaged and moved relative to said carriage by said vibrating means, and stationary pallet supports arising from said frame structure for effecting the support of moldable material placed in and shaped by said mold throughout all operating positions of the mold.

2. A molding machine for producing ceramic building blocks, comprising a supporting frame, vertically disposed guides formed with said frame, a mold carriage arranged within said frame and movable vertically with respect thereto in connection with said guides, a mold supported on said carriage for limited vertical movement relative thereto, power driven devices carried by said carriage for imparting vibratory movement to said mold to effect compaction of the moldable materials placed therein, a fluid actuated elevator for vertically moving said mold and its carriage between material-receiving and discharging positions, and stationary pallet receiving means for effecting the support of a pallet in the bottom of the mold when the latter occupies its elevated material-receiving and molding position and to maintain the support of the molded material on a pallet when the mold has been lowered to a discharging position.

3. A molding machine for producing ceramic building block comprising a supporting frame, vertically disposed guides formed with said frame, a mold carriage arranged within said frame and movable vertically with respect thereto in said guides, a hoist for raising and lowering said carriage, a mold supported by said carriage and having limited vertical movement with respect thereto, a vibrator shaft rotatably journaled in said carriage, power driven means movable in unison with said carriage for rotating said shaft, and cams rotatable with said shaft and engageable with said mold for imparting vibratory movement to the latter, wherein to effect compaction of the materials placed in said mold.

4. A molding machine for producing cementitious building blocks, comprising a supporting frame, a mold carriage arranged within said frame for vertical movement with respect thereto, a box-like mold supported by said carriage and having limited vertical movement with respect thereto, adjustable studs rigidly connected with the lower portions of said mold, and a plurality of rotatable cams journaled in said carriage, said cams being engageable with said studs to impart vibratory movement to the mold.

5. A molding machine for producing cementitious building blocks, comprising a supporting frame, a mold carriage arranged within said frame for vertical movement with respect thereto, a box-like mold supported by said carriage and having limited vertical movement with respect thereto, adjustable studs rigidly connected with the lower portions of said mold, a plurality of rotatable cams journaled in said carriage, said cams being engageable with said studs to impart vibratory movement to the mold, and stationary frame supported rods extending into said mold for effecting the support of a pallet upon which the moldable material is received when the mold is in either its elevated or lowered positions.

6. A machine for producing molded ceramic blocks, comprising a supporting frame, vertically disposed guides formed with said frame, a mold carriage arranged within said frame and movable vertically with respect thereto along said guides, a box-like mold supported on said carriage for limited vertical movement in relation to the carriage, fluid actuated means for raising and lowering the carriage and its associated mold, whereby to cause the mold to assume an elevated material-receiving position and a lowered material-discharging position, stationary pallet supporting means carried by said frame and extending into said mold, and vibrating means mounted on said carriage for moving said mold relative to said carriage to effect compaction of moldable materials placed therein.

7. In a molding machine, a supporting frame, vertically disposed guides formed with said frame, a mold carriage arranged within said frame and movable vertically with respect thereto along said guides, a mold having a base plate and a superposed box-like frame, said mold being joined with said carriage for limited vertical movement with respect thereto, fluid actuated elevator means for raising and lowering said carriage and mold, a motor supported by said carriage, and a plurality of cams driven by said motor, said cams engaging said mold to impart vibratory movement thereto.

8. A molding machine for producing cementitious building blocks, comprising a supporting frame, a mold carriage arranged within said frame for vertical movement with respect thereto, a box-like mold supported by said carriage and having limited vertical movement with respect thereto, and power operated means for alternately raising and lowering the opposite ends of said mold to compact cementitious materials placed therein.

9. A molding machine for producing cementitious building blocks, comprising a supporting frame, a mold carriage arranged within said frame for vertical movement with respect thereto, a box-like mold supported by said carriage and having limited vertical movement with respect thereto, a horizontally extending shaft journaled in said carriage below said mold, a cam member carried adjacent each end of said shaft, said cam members having a plurality of shoulders, the shoulders on one cam being offset with respect to the shoulders on the other cam, and means for rotating said shaft to move the shoulders on said cams into engagement with said mold to impart vibratory movement thereto.

10. A molding machine for producing cementitious building blocks, comprising a supporting frame, a mold carriage arranged within said frame for vertical movement with respect thereto, a box-like mold supported by said carriage and having limited vertical movement with respect thereto, a horizontally extending shaft journaled in said carriage below said mold, a cam member carried adjacent each end of said shaft, said cam members having a plurality of shoulders, the shoulders on one cam being offset with respect to the shoulders on the other cam, a pulley secured to said shaft, motor means supported on said carriage in spaced relation to said shaft, a sheave wheel carried by the armature shaft of said motor, and an endless belt extending around said sheave wheel and said pulley to transmit rotary movement from said motor to said shaft to move the shoulders on said cams into engagement with said mold.

GUY V. FEARN.